United States Patent [19]

Shaw et al.

[11] 4,110,545

[45] Aug. 29, 1978

[54] ELECTRODES FOR GLASS FURNACES

[75] Inventors: Gordon Brian Shaw, Sheffield; Richard John Brinkman, Wolverhampton, both of Great Britain

[73] Assignee: Pickford Holland & Company Limited, Sheffield, England

[21] Appl. No.: 747,177

[22] Filed: Dec. 3, 1976

[30] Foreign Application Priority Data

Dec. 5, 1975 [GB] United Kingdom ............... 50118/75

[51] Int. Cl.[2] .......................... C03B 5/02; F27D 11/04

[52] U.S. Cl. ............................................ 13/6; 13/25

[58] Field of Search .................................. 13/6, 23, 25

[56] References Cited

U.S. PATENT DOCUMENTS 3,813,468 5/1974 Shaw ......................................... 13/6

*Primary Examiner*—R. N. Envall, Jr.

*Attorney, Agent, or Firm*—Lowe, King, Price & Markva

[57] ABSTRACT

A ceramic electrode comprises an electrode body having at least one longitudinal hole, an elongated hollow connector member of a noble metal having a cross-sectional shape corresponding to that of the hole and being a close fit in the hole, and a plug member having a cross-sectional shape corresponding to that of the connector member, and being a close fit within the connector member, the plug being formed from the same material as the electrode or from a material having the same expansion characteristics as the electrode material.

11 Claims, 3 Drawing Figures

ELECTRODES FOR GLASS FURNACES

This invention relates to electrodes for glass furnaces, and is particularly concerned with ceramic electrodes, more particularly tin oxide electrodes, and the provision of efficient electrical connection to the electrode.

Tin oxide electrodes are used for introducing the electric power into glass, particularly lead glass, during electric melting. The electrodes may be used in the main part of a tank furnace or in other parts of the furnace, e.g. throat, riser or forehearth. They can be used where electricity is the sole source of power or as boosters in furnaces fired by other sources of energy. Tin oxide appears to be the most suitable electrode material for melting lead glasses, since, unlike materials such as molybdenum and graphite, it does not reduce the lead oxide to metallic lead. Furthermore, it does not colour the glass significantly.

Tin oxide as normally produced commercially, contains small quantities of additives to promote electrical conduction and sinterability. However, although the electrical conductivity is high at glass melting temperatures it is generally much lower at lower temperatures. Experiments have shown that, for tin oxide large currents can only be conducted efficiently above about 700° C. A difficulty arises, therefore in making an electrical connection to an electrode passing through a furnace wall where, although one end is immersed in molten glass at relatively high temperatures, the other end is relatively cool. Passage of high currents through low temperature regions of tin oxide causes self heating of the electrode which can cause cracking under certain circumstances. Further, the dissipation of power by self-heating is inefficient and can lead to other problems such as glass leaking back through the annulus between the electrode and the furnace wall.

In an attempt to overcome the above disadvantages, a number of ways of effecting electrical connection to tin oxide electrodes have been attempted. Thus it is known for the electrode to be externally silvered along its length by the application of a silver dispersion followed by firing to form a coherent layer, with the provision of an external clamp secured to the cooler end of the silvered electrode to provide the connection to a supply of electricity. The current is then conducted via the silver layer to by-pass the low temperature, low conductivity zone of the electrode. By the point along the length of the electrode at which the silver has melted (at an approximate temperature of 960° C) tin oxide is sufficiently conductive to carry the electrical load itself. However, such silver layers are extremely thin, e.g., of the order of 0.025 mm, and are particularly vulnerable to attack from corrosive atmospheres and molten glass and to mechanical damage, any of which can destroy the continuity of the silver layer. To avoid the problems of silver layers, U.S. Pat. No. 3,329,137 proposes that silver rods should be inserted into holes extending from the cold end of the electrode to beyond the point where the temperature of the electrode in service will be such as to melt the silver rod, the molten silver providing the required electrical contact with the electrode. However, this requires that the electrode be at a sufficient (a substantial angle) to the horizontal such that when the hot end of the silver rod melts molten silver can run back through the gap between the silver rod and the hole in the electrode until it reaches a point where the temperature of the electrode is not sufficient to maintain the silver molten. At that point, it freezes to provide the electrical contact between the silver rod and the electrode. The disadvantages of such construction are that the contact area between the silver and the electrode is necessarily small causing a heavy concentration of current at that point, and which is undesirable, and that the molten silver can penetrate the tin oxide.

It is also known (see for example British Patent Specification No. 1,381,194) to employ an expandable connector, which, after insertion into a hole in the electrode can be expanded such that the connector and the electrode are brought into intimate contact. Whilst this does provide an efficient means of providing electrical contact over a relatively large area, it is not possible because of the prohibitive cost to make such expandable connector from a noble metal such as silver. Even when the connector is made of a relatively deformable material such as copper, and even when slotted to allow for thermal expansion there is a distinct tendency to rupture the electrode by virtue of the differential thermal expansion effect during use. A further known form of connection (see U.S. Pat. No. 3,681,506) is one which fits flush with the whole of the back face of the electrode in an attempt to permit uniform current and voltage distribution within the electrode. However this results in the generation of heat as the current passes through the low conductivity zone of the tin oxide electrode which is wasteful of electricity, and can lead to problems such as glass leakage back between the electrode and the access hole in the furnace wall.

According to the present invention, a ceramic electrode comprises an electrode body having at least one longitudinal hole, an elongated hollow connector member of a noble metal having a cross-sectional shape corresponding to that of the hole and being a close fit in the hole, and a plug member having a cross-sectional shape corresponding to that of the connector member and being a close fit within the connector member, the plug member being formed from the same material as the electrode or from a material having the same expansion characteristics as the electrode material. To ensure good contact between the connector member and the hole, they may be correspondingly tapered. Preferably the noble metal is silver.

Thus, with the silver connector member extending along the electrode from the cold end to a position where, in service, the temperature will be greater than that at which the electrode material is sufficiently electrically conductive and with the intimate contact provided by the tight fit of the connector member in the hole and the plug member in the connector member, an efficient electrical connection is made. Thus, when the material of the electrode is tin oxide, current is carried by the connector member beyond the point where the tin oxide has itself become sufficiently electrically conductive to avoid self heating. By extending the plug and the surrounding silver connector member out of the electrode body, providing an electrical connection to the connector member is relatively simple.

Because the connector member is hollow, e.g., cylindrical, forming it completely of silver preferably of 99.5% purity is not cost prohibitive, and has the advantage of avoiding undesirable oxidation and subsequent reaction with the tin oxide. The conducting properties of silver are such that only thin wall sections are necessary. Thus the wall need only be, e.g., 0.13 mm thick. By forming the hole in the electrode as large as possible (whilst retaining sufficient strength), a connector member of large surface area can be used to provide a large area of electrical contact with the electrodes. It is further preferred but not essential to apply a silver coating on the wall of the hole prior to insertion of the sleeve. This acts to reduce contact resistance between the sleeve and the tin oxide.

With a tin oxide electrode, it is preferred that tin oxide is utilised as the material for the plug. However, a compatible refractory material can be used for the plug such as zircon or mullite.

One embodiment of the invention will now be described with reference to the accompanying drawings in which.

Figure 1:
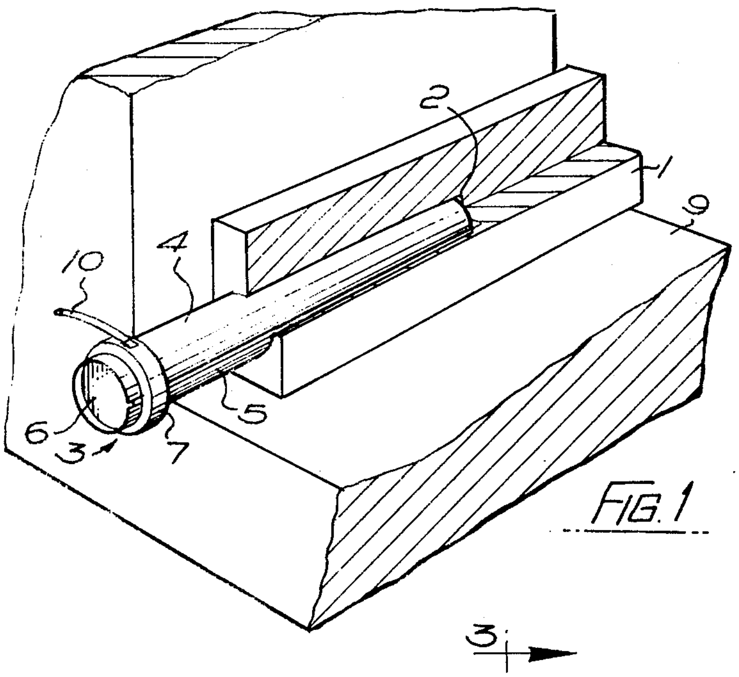
FIG. 1 is a part sectional perspective view of a connector in accordance with the invention.
Figure 2:
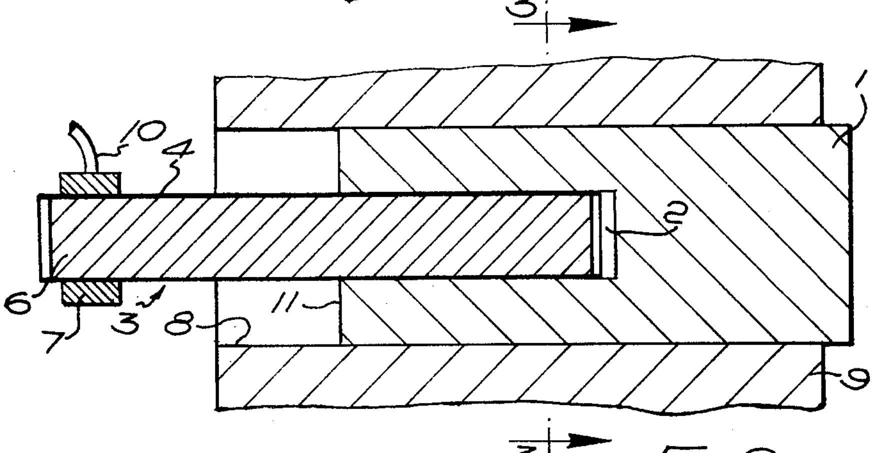
FIG. 2 is a sectional side elevation through the connector of FIG. 1.
Figure 3:
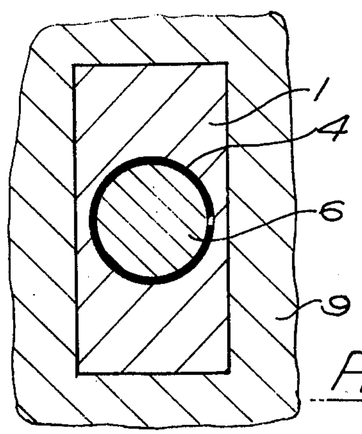
FIG. 3 is a section on the line 3—3 of FIG. 2.

In the drawings an electrode 1 formed from tin oxide is provided with a generally central blind hole 2 emerging at the cold end of the electrode. Fitted in the hole is a connector 3 formed by a generally cylindrical sleeve 4 of silver having a longitudinal slot 5 within which lies a plug 6 of the same material as the electrode 1 or of a material having the same or similar expansion characteristics. The silver sleeve and plug extend out of the hole 2, and at the exposed end there is provided two close fitting semi-circular saddle clamps 7 which circumvent the silver sleeve 4 and which are bolted together provide a good electrical contact with the silver sleeve. The relative dimensions of the plug 6, the sleeve 4, and the hole 2 in the electrode are such that with the silver tube 4 inserted in the hole, and the plug 6 subsequently pushed down the bore of the sleeve, the sleeve is forced by the plug into intimate contact with the wall of the hole 2 thereby ensuring good electrical contact with the electrode over the length of the sleeve 4 within the hole. To further enhance the electrical contact, it is preferable (although not essential) to provide a silver layer in the wall of the hole such as by painting the wall of the hole with a silver suspension which forms a coherent layer of firing.

Thus with the electrode 1 inserted through an appropriate access hole 8 in a furnace wall 9, and with the saddle clamps 7 suitably connected by a lead 10 to a source of electricity, the electrode is ready for service.

Because the connector 3 extends out of the electrode 1, this has the advantage that the end 11 of the electrode can be set inside the furnace wall, which not only allows an electrode of reduced length to be utilised with a consequent saving on tin oxide, but also because the electrode itself does not protrude beyond the furnace wall there is the elimination of the possibility of damage to the electrode. Equally advantageous is the fact that the plug 6 being of the same material as the electrode or of a material selected to have the same expansion characteristics as the electrode material, there is no differential expansion sufficient to cause damage to the electrode in service. Beyond that the silver sleeve being of the order of 0.6 mm in thickness does not have the vulnerability to damage and corrosion as does the known silvered layer constructions and accordingly the effectiveness of the electrical contact provided by the silver sleeve over all of its length can be guaranteed.

Unlike the prior constructions employing silver rods, the electrode of the invention can be set at any desired angle as there is no need to have the end of the silver sleeve at a point along the electrode where it would melt, melting not being required to bring about good electrical connection. By avoiding the need to melt the silver there is a reduction in the loss of silver which when molten can permeate the tin oxide. It is also the case that the electrical contact area of the electrode of the invention is considerably larger than with constructions employing silver rods whilst at the same time using considerably less silver.

The electrode of the invention has still further advantages, thus it can be preassembled and be ready to pass current as soon as the temperature of the electrode reaches a point where the tin oxide material is sufficiently conductive to carry the load, and there is the complete avoidance of the need to mechanically expand any component of the connector to bring about good electrical connection. Any expansion of the silver sleeve, because it is comparatively thin, exerts a negligible bursting tendancy.

To exemplify the performance characteristics of an electrode constructed in accordance with the invention, a tin oxide electrode 70 mm in diameter 350 mm long was drilled axially at one end to a depth of 115 mm using a 38.6 mm outside diameter core drill. The wall of the resulting hole was subsequently painted with a silver suspension and the electrode fired to 600° C to form a coherent layer. A sheet of silver (99.9%) 0.4 mm thick was formed into a hollow cylinder 38 mm diameter × 150 mm long. This was inserted into the silvered hole in the electrode until it reached the bottom of the hole. A solid plug of tin oxide 37.7 mm diameter × 150 mm long was pushed inside the silver sleeve. Being a tight fit, this had the effect of forcing the sleeve into contact with the silvered wall of the hole in the electrode. An electrical connection was made to the silver sleeve by the use of two close fitting semi circular "saddle" clamps which, when bolted together, circumvented the silver sleeve and its inner plug to make an effective electrical contact.

To simulate use in a glass furnace an electrical connection to the other end of the electrode was provided to complete the circuit that in practice would be completed by the molten glass. Thus the electrode was externally silvered and fitted with semi circular saddle clamps to which the electrical connection was made directly.

The internal silver connector, was tested by placing the electrode in a tube furnace which served to raise the temperature of the electrode and its connectors to simulate service conditions. Thermocouples at positions $T_1$, $T_2$ and $T_3$ recorded the actual temperatures attained. The following temperatures were recorded over the test period of 698 hours (29 days):

| | mean | range |
|---|---|---|
| $T_1$ | 865° C | 800 - 920° C |
| $T_2$ | 805 | 750 - 830 |
| $T_3$ | 670 | 580 - 725 |

Out of the total test period of 698 hours current was passed through the electrode via the connectors for 111 hours in 21 separate periods each of approximately 5 hours. The mean current during this time was 130 amps, rather more than would be typical for an electrode of this diameter if used for melting glass. The current was switched on at the outset of each of the 21 periods such that the full current was applied virtually instantaneously, not gradually as would be in the case in actual service. In this way the electrode and connector were subjected to conditions that would be the most severe encountered in service.

Current was conducted through the electrode perfectly satisfactorily under these conditions, e.g., no fluctuations in applied voltage or current were recorded, proving that good electrical contact was being made throughout the test. After the complete assembly had been allowed to cool down to room temperature it was reheated to the test temperature and the current load applied therein. Performance remained satisfactory.

As was expected a small amount of heat, approximately 100 watts, was generated by the passage of the current through the electrode. This was sufficient to raise $T_1$ by about 50° C and the connector temperature ($T_2$ and $T_3$) by 30° C. These temperature increases took place over a few minutes following switching on the current and no ill effects were noted.

After the test the electrode was sectioned through the area occupied by the connector and there had been very little change in the condition of the silver sleeve and the tin oxide. The only observation of note was that the silver sleeve had formed a weak bond with the tin oxide at the hotter end. This is regarded as a beneficial factor since it would increase the efficienty of electrical contact. There were no signs of chemical reaction adjacent to the silver sleeve nor was there any sign of phyical damage.

What we claim is:

1. A ceramic electrode comprising an electrode body having at least one longitudinal hole, an elongated, thin-walled hollow connector member of a noble metal having a cross-sectional shape corresponding to that of the hole and being a close fit in the hole, and a plug member having a cross-sectional shape corresponding to that of the connector member, and being a close fit within the connector member, the plug being formed from a material having subtantially the same expansion characteristics as the electrode material.

2. A ceramic electrode as in claim 1 wherein, the noble metal is silver.

3. An electrode as in claim 1 wherein, the connector member and the hole are correspondingly tapered.

4. An electrode as in claim 1, wherein the material of the electrode and the plug member is tin oxide.

5. An electrode as in claim 1 wherein, the material of the electrode is tin oxide and the material of the plug member is zircon or mullite.

6. An electrode as in claim 1 wherein, the plug and the surrounding silver connector member extend out of the electrode body.

7. An electrode as in claim 1 wherein, a silver coating is applied on the wall of the hole prior to insertion of the sleeve.

8. An electrode as in claim 1 wherein, an electrical connection is provided to the exposed end of the elongated hollow connector member by clamp means circumventing the hollow member.

9. A connector for a ceramic electrode comprising an elongated, thin-walled hollow connector member adapted for insertion into a hole in an electrode body and further adapted for connection to a source of electricity, and a plug member having a cross-sectional shape corresponding to that of the connector member and adapted to lie within the connector member, the plug member being formed from a material having substantially the same expansion characteristics as the electrode for which the connector is intended.

10. A ceramic electrode as in claim 1, wherein the plug member is formed from the same material as the electrode body.

11. A connector for a ceramic electrode as in claim 9, wherein the plug member is formed from the same material as the electrode.

* * * * *